(12) United States Patent
Miyajima et al.

(10) Patent No.: US 7,190,529 B2
(45) Date of Patent: Mar. 13, 2007

(54) ZOOM LENS

(75) Inventors: Toru Miyajima, Hachioji (JP); Masaru Morooka, Akishima (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/263,863

(22) Filed: Nov. 2, 2005

(65) Prior Publication Data

US 2006/0098302 A1 May 11, 2006

(30) Foreign Application Priority Data

Nov. 9, 2004 (JP) ............................ 2004-324594

(51) Int. Cl.
*G02B 15/14* (2006.01)
(52) U.S. Cl. ...................... 359/687; 359/686
(58) Field of Classification Search ................ 359/683, 359/685, 686, 687
See application file for complete search history.

(56) References Cited

U.S. PATENT DOCUMENTS 6,191,895 B1   2/2001   Arimoto et al.
6,462,886 B1   10/2002  Hagimori
7,126,762 B2 * 10/2006  Yoshitsugu ................. 359/687
2006/0098301 A1 * 5/2006 Miyajima .................... 359/686

\* cited by examiner

*Primary Examiner*—David N. Spector
(74) *Attorney, Agent, or Firm*—Kenyon & Kenyon LLP (57) ABSTRACT

The invention is concerned with a high-zoom-ratio, high-performance zoom lens that is much more improved in compactness. The zoom lens comprises a first lens group G1 of positive refracting power, a second lens group G2 of negative refracting power, a third lens group G3 of positive refracting power and a fourth lens group G4 of positive refracting power, with a varying space between adjacent lenses during zooming. Upon zooming from the wide-angle end to the telephoto end of the zoom lens system, the first lens group G1 is positioned nearer to the object side at the telephoto end than at the wide-angle end. The zoom lens of the invention satisfies a specific condition for properly defining the refracting power of the first lens group and a specific condition for defining the transverse magnification of the second lens group.

25 Claims, 6 Drawing Sheets

ZOOM LENS

This application claims benefit of Japanese Application No. 2004-324594 filed in Japan on Nov. 9, 2004, the contents of which are incorporated by this reference.

BACKGROUND OF THE INVENTION

The present invention relates generally to a zoom lens, and more particularly to a high-zoom-ratio zoom lens including a wide-angle range.

Today's mainstream high-zoom-ratio zoom lenses for digital camera purposes are of the type comprising, in order from its object side, a first lens group having positive refracting power, a second lens group having negative refracting power, a third lens group having positive refracting power and a fourth lens group having positive refracting power. Patent publications 1 and 2 have come up with a zoom lens of the type where the first lens group is allowed to move toward the object side, thereby achieving high performance well fit especially for an image pickup device that has a zoom magnification of 8 or greater and a decreased pitch.

However, the zoom lens of patent publication 1 still fails to achieve a wide-angle arrangement, because its half angle of view is barely 30° at the wide-angle end. Patent publication 2, on the other hand, is prima facie satisfactory in terms of a wide-angle arrangement, because its half angle of view is of the order of 35° at the wide-angle end. Still, it fails to have any sufficient back focus at the wide-angle end with a limited space for focusing, rendering it difficult to keep the angle of incidence of light on an image pickup device CCD substantially parallel. To achieve ever higher performance and ever higher zoom ratios, it is thus necessary to reassess the refracting power layout of each lens group.

Patent Publication 1
JP(A)11-109241
Patent Publication 2
JP(A)2001-350092

SUMMARY OF THE INVENTION

Such being the prior art state, the primary object of the invention is to provide a high-zoom-ratio, high-performance zoom lens that is improved in compactness. One specific object of the invention is to provide a zoom lens of improved performance, which, albeit being composed of a few lens groups, i.e., four components of +−++ power profile, has a zoom ratio of about 8 to 10 and a half angle of view of at least about 35° at the wide-angle end and lends itself well to an optical system for leading-edge image pickup devices having a limited pixel pitch.

According to the first aspect of the invention, there is provided a zoom lens comprising, in order from its object side, a first lens group of positive refracting power, a second lens group of negative refracting power, a third lens group of positive refracting power and a fourth lens group of positive refracting power with a varying space between adjacent lens groups during zooming, wherein:

upon zooming from the wide-angle end to the telephoto end of the zoom lens system, the first lens group moves nearer to the object side at the telephoto end than at the wide-angle end, and the zoom lens system satisfies the following conditions:

$$5.7 < f_1/f_w < 20 \quad (1)$$

$$4.1 < M_{2t}/M_{2w} < 15 \quad (2)$$

where $f_1$ is the focal length of the first lens group,
$f_w$ is the focal length of the zoom lens system at the wide-angle end,
$M_{2t}$ is the transverse magnification of the second lens group at the telephoto end, and
$M_{2w}$ is the transverse magnification of the second lens group at the wide-angle end.

The advantage of, and the requirement for, the first zoom lens arranged as above is now explained.

In the zoom lens arrangement of the invention, the positive first lens group and the negative second lens group are so closely located at the wide-angle end that upon zooming to the telephoto end, the first lens group and the second lens group can move in such a way that their space becomes wide.

To achieve a high-zoom-ratio arrangement, the space between the first lens group and the second lens group must be wide. When only the second lens group is allowed to move while the first lens group remains fixed during zooming, there is an increased space between the first lens group and an aperture stop, resulting in an increase in the diameter of lenses in the first lens group. Therefore, if the first lens group is allowed to move toward the object side, then it ensures that there is a sufficient space between the first lens group and the second lens group at the telephoto end, which in turn makes it possible to position the first lens group nearer to the image side at the wide-angle end. Accordingly, the space between the first lens group and the aperture stop at the wide-angle end can be narrowed to reduce the diameter of the first lens group.

Also in the zoom lens arrangement of the invention, the third lens group is designed to move toward the object side in such a way that upon zooming to the telephoto end, the space between the second lens group and the third lens group becomes narrow to allocate a part of zooming to the third lens group. Accordingly, it is possible to decrease the amount of movement of the second lens group for zooming.

This arrangement enables the amount of movement of each lens group during zooming to become small, so that fluctuation of aberrations with zooming can be minimized to ensure satisfactory aberration performance all over the zooming range.

Further, the satisfaction of conditions (1) and (2) permits the zoom lens arrangement of the invention to have high zoom capability and a wide angle of view of at least about 35° at the wide-angle end.

Condition (1) is to properly define the refracting power of the first lens group. As the lower limit of 5.7 to condition (1) is not reached, it causes the refracting power of the first lens group to become too strong to make correction for spherical aberrations at the wide-angle end in particular. As the upper limit of 20 to condition (1) is exceeded, it causes the refracting power of the first lens group to become too weak with the consequence that the refracting power of the second lens group, too, becomes relatively weak. In this case, the amount of movement of the second lens group becomes large, and so the first lens group is positioned relatively nearer to the object side at the wide-angle end, resulting in an increase in the diameter of the first lens group and rendering it difficult to ensure compactness.

Condition (2) is to define the transverse magnification of the second lens group. As the lower limit of 4.1 to condition (2) is not reached, the zoom sharing of the second lens group becomes too small, and so the zoom sharing of the third lens group becomes relatively large. This in turn causes the amount of movement of the third lens group to become large, resulting in an increase in the length of the lens system at the telephoto end. As the upper limit of 15 to condition (2) is exceeded, it causes the zoom sharing of the second lens group to because too large. This in turn causes an increase in the amount of movement of the second lens group during zooming, rendering it difficult to ensure compactness.

The lower limit to condition (1) could be set at 7.0, especially 8.0.

The upper limit to condition (1) could be set at 15.0, especially 10.0.

The lower limit to condition (2) could be set at 4.3, especially 4.5.

The upper limit to condition (2) could be set at 10.0, especially 6.0.

According to the second aspect of the invention, the first zoom lens is further characterized by satisfying the following condition.

$$2.7 < f_3/f_w < 15 \quad (3)$$

Here $f_3$ is the focal length of the third lens group.

The advantage of, and the requirement for, the second zoom lens arranged as described above is now explained.

Condition (3) is to properly define the refracting power of the third lens group. As the lower limit of 2.7 to condition (3) is not reached, it causes the refracting power of the third lens group to become too strong to ensure any back focus at the wide-angle end. As the upper limit of 15 to condition (3) is exceeded, it causes the refracting power of the third lens group to become too weak, resulting in an increase in the amount of movement of the third lens group and, hence, an increase in an increase in the length of the lens system.

The lower limit to condition (3) could be set at 3.0, especially 3.2.

The upper limit to condition (3) could be set at 10.0, especially 5.0.

According to the third aspect of the invention, there is provided a zoom lens comprising, in order from its object side, a first lens group of positive refracting power, a second lens group of negative refracting power, a third lens group of positive refracting power and a fourth lens group of positive refracting power with a varying space between adjacent lenses during zooming, wherein:

upon zooming from the wide-angle end to the telephoto end of the zoom lens system, the first lens group is allowed to moves nearer to the object side at the telephoto end than at the wide-angle end, and the zoom lens system satisfies the following conditions:

$$5.7 < f_1/f_w < 20 \quad (1)$$

$$3.2 < M_{2t}/M_{2w} < 15 \quad (2)'$$

$$2.7 < f_3/f_w < 15 \quad (3)$$

where $f_1$ is the focal length of the first lens group, $f_w$ is the focal length of the zoom lens system at the wide-angle end, $M_{2t}$ is the transverse magnification of the second lens group at the telephoto end, $M_{2w}$ is the transverse magnification of the second lens group at the wide-angle end, and $f_3$ is the focal length of the third lens group.

The advantage of, and the requirement for, the third zoom lens arranged as mentioned above is now explained.

In the zoom lens arrangement of the invention, the positive first lens group and the negative second lens group are so closely located at the wide-angle end that upon zooming to the telephoto end, the first lens group and the second lens group can move in such a way that their space becomes wide.

To achieve a high-zoom-ratio arrangement, the space between the first lens group and the second lens group must be wide. When only the second lens group is allowed to move while the first lens group remains fixed during zooming, there is an increased space between the first lens group and an aperture stop, resulting in an increase in the diameter of lenses in the first lens group. Therefore, if the first lens group is allowed to move toward the object side upon zooming, then it ensures that there is a sufficient space between the first lens group and the second lens group at the telephoto end, which in turn makes it possible to position the first lens group nearer to the image side at the wide-angle end. Accordingly, the space between the first lens group and the aperture stop at the wide-angle end can be narrowed to reduce the diameter of the first lens group.

Also in the zoom lens arrangement of the invention, the third lens group is designed to move toward the object side in such a way that upon zooming to the telephoto end, the space between the second lens group and the third lens group becomes narrow to allocate a part of zooming to the third lens group. Accordingly, it is possible to decrease the amount of movement of the second lens group for zooming.

This arrangement enables the amount of movement of each lens group during zooming to become small, so that fluctuation of aberrations with zooming can be minimized to ensure satisfactory aberration performance all over the zooming range.

By the satisfaction of conditions (1), (2)' and (3), the zoom lens arrangement of the invention can have high zoom ratios and wide-angle capability.

Condition (1) is to properly define the refracting power of the first lens group. As the lower limit of 5.7 to condition (1) is not reached, it causes the refracting power of the first lens group to become too strong to make correction for spherical aberrations at the wide-angle end in particular. As the upper limit of 20 to condition (1) is exceeded, it causes the refracting power of the first lens group to become too weak with the consequence that the refracting power of the second lens group, too, becomes relatively weak. In this case, the amount of movement of the second lens group becomes large, and so the first lens group is positioned relatively nearer to the object side at the wide-angle end, resulting in an increase in the diameter of the first lens group and rendering it difficult to ensure compactness.

Condition (2)' is to define the transverse magnification of the second lens group. As the lower limit of 3.2 to condition (2) is not reached, the zoom sharing of the second lens group becomes too small, and so the zoom sharing of the third lens group becomes relatively large. This in turn causes the amount of movement of the third lens group to become large, resulting in an increase in the length of the lens system at the telephoto end. As the upper limit of 15 to condition (2)' is exceeded, it causes the zoom sharing of the second lens group to because too large. This in turn causes an increase in the amount of movement of the second lens group during zooming, rendering it difficult to ensure compactness at the wide-angle end.

Condition (3) is to properly define the refracting power of the third lens group. As the lower limit of 2.7 to condition (3) is not reached, it causes the refracting power of the third lens group to become too strong to ensure any back focus at the wide-angle end. As the upper limit of 15 to condition (3) is exceeded, it causes the refracting power of the third lens group to become too weak, resulting in an increase in the amount of movement of the third lens group and, hence, an increase in an increase in the length of the lens system.

The lower limit to condition (1) could be set at 7.0, especially 8.0.

The upper limit to condition (1) could be set at 15.0, especially 10.0.

The lower limit to condition (2)' could be set at 4.1, especially 4.3, and more especially 4.5.

The upper limit to condition (2)' could be set at 10.0, especially 6.0.

The lower limit to condition (3) could be set at 3.0, especially 3.2.

The upper limit to condition (3) could be set at 10.0, especially 5.0.

According to the fourth aspect of the invention, any one of the first to third zoom lenses is further characterized in that an aperture stop is interposed between the second lens group and the third lens group, and remains fixed in terms of position upon zooming from the wide-angle end to the telephoto end.

The advantage of, and the requirement for, the fourth zoom lens arranged as mentioned above is now explained.

When the aperture stop fixed in front of the third lens group is designed to move simultaneously with zooming, the space between the second lens group and the third lens group reaches a maximum at the wide-angle end and the space between the first lens group and the stop becomes large. This renders it difficult to locate an entrance pupil position on the object side, imposing some limitation on decreasing the diameter of the first lens group. In the zoom lens of the invention, therefore, the position of the aperture stop at the wide-angle end is determined such that it is positioned nearer to the second lens group with an air separation provided between it and the third lens group. This then allows the entrance pupil position to be located nearer to the object side, so that the diameter of the first lens group can be diminished. This also permits the amount of movement of the aperture stop to become small between the wide-angle end and the telephoto end. Thus, the fixation of the aperture stop during zooming is desirous for simplification of a lens barrel structure.

According to the fifth aspect of the invention, any one of the first to fourth zoom lenses is further characterized in that the third lens group comprises at least one aspheric lens.

The advantage of, and the requirement for, the fifth zoom lens arranged as mentioned above is now explained.

To achieve further size reductions in the zoom lens arrangement of the invention, the refracting power of each lens group must be enhanced to some degrees. In this case, it would be difficult to make correction for spherical aberrations occurring at the third lens group close to the aperture stop. In the invention, therefore, at least one aspheric surface is used with the third lens group for the purpose of making satisfactory correction for spherical aberrations produced at the third lens group, thereby achieving compactness while keeping satisfactory aberration performance all over the zooming range.

The present invention also encompasses an imaging system comprising any one of the above zoom lenses and an electronic image pickup device located on its image side. The zoom lens of the invention works for an electronic imaging system, because high performance and high zoom ratios are achievable in a compact form. Note that the imaging system includes not only digital cameras but also video cameras, digital video units, etc.

It is also noted that the advantage of each inventive zoom lens could be more enhanced if used in any desired combination. Commonly throughout the conditions defined above, only the upper or lower limit to each narrower condition could be applied as the upper or lower limit to the associated broader condition.

The advantages of the invention could be more enhanced if the above conditions are applied in any desired combination.

Thus, the present invention can provide a high-zoom-ratio, high-performance zoom lens that is improved in compactness.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1A:
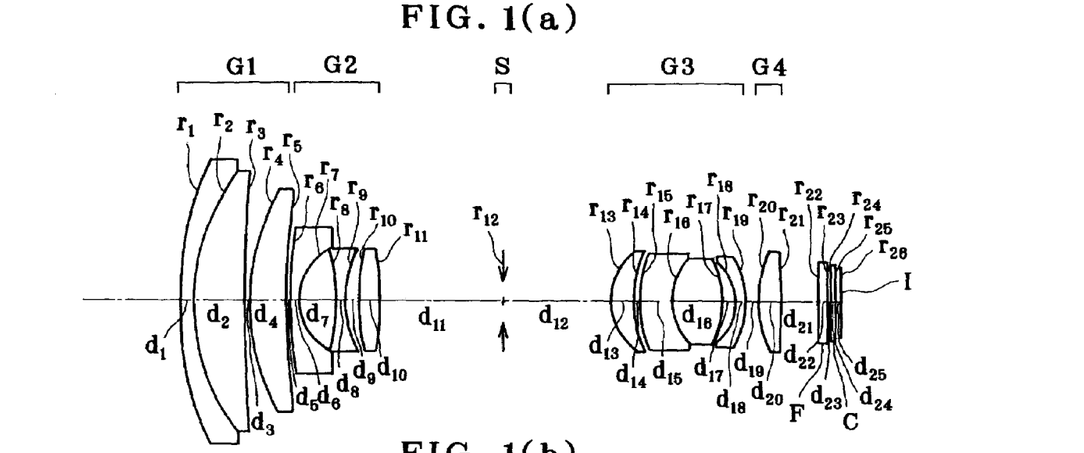
FIG. 1 is illustrative in lens arrangement section of Example 1 of the inventive zoom lens at the wide-angle end (a), in an intermediate setting (b) and at the telephoto end (c) upon focusing on an infinite object point.
Figure 1B:
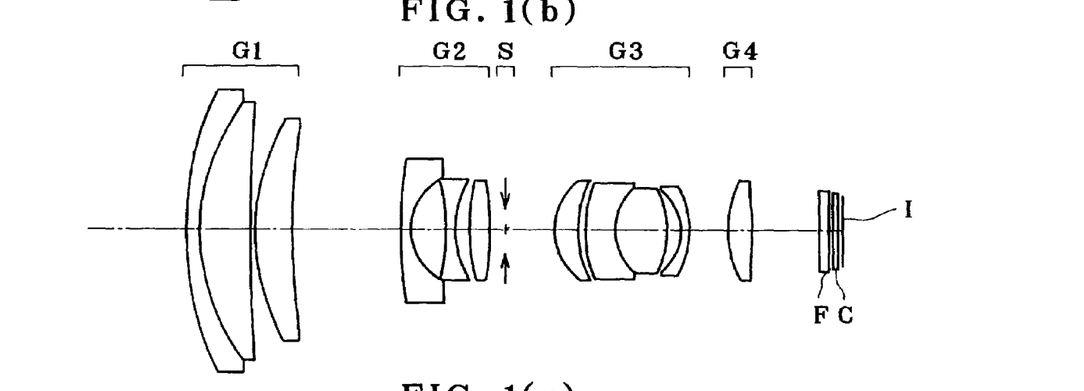
Figure 1C:
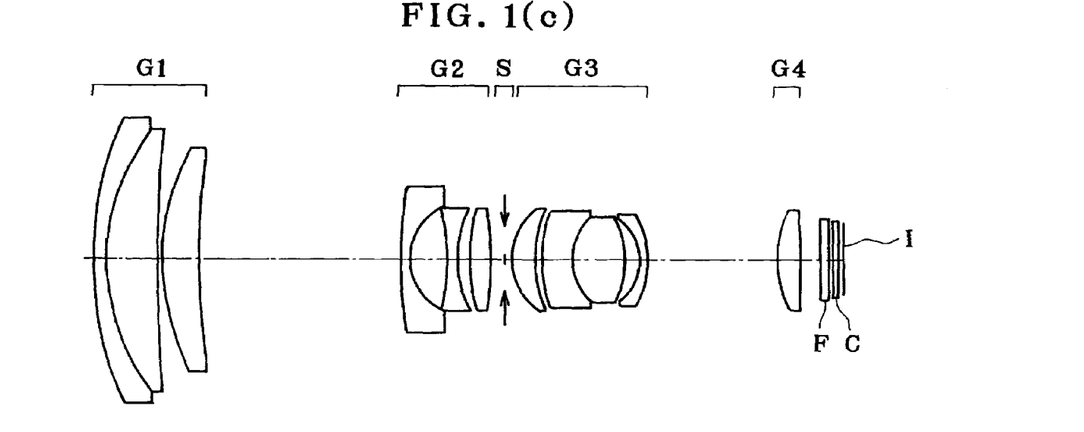
Figure 2A:
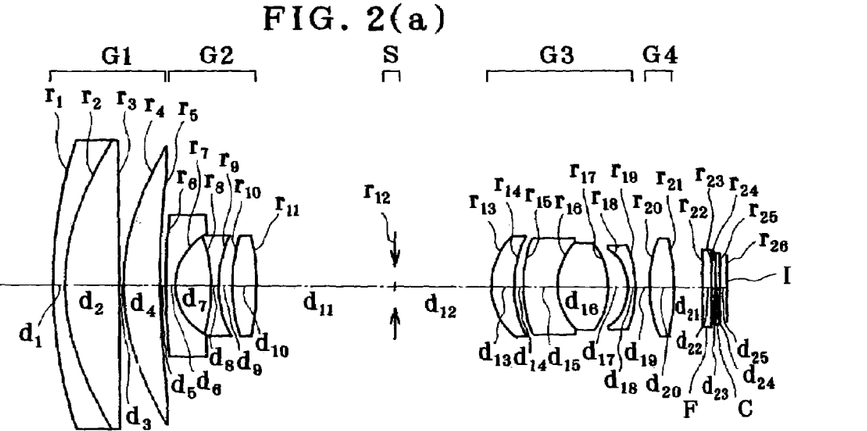
FIG. 2 is illustrative of Example 2 of the inventive zoom lens as in FIG. 1.
Figure 2B:
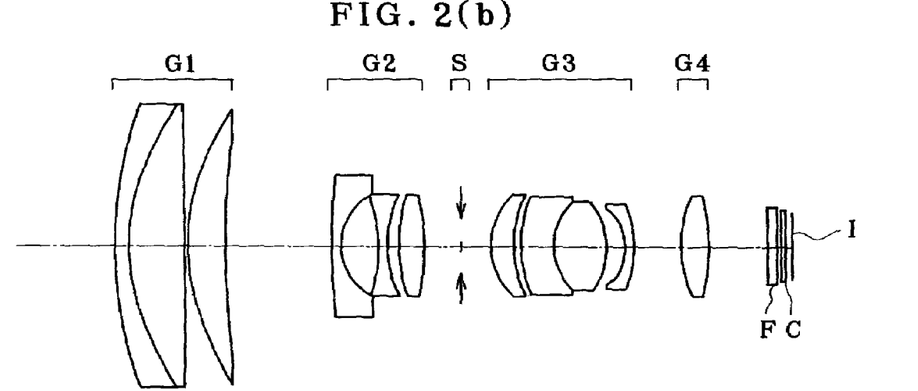
Figure 2C:
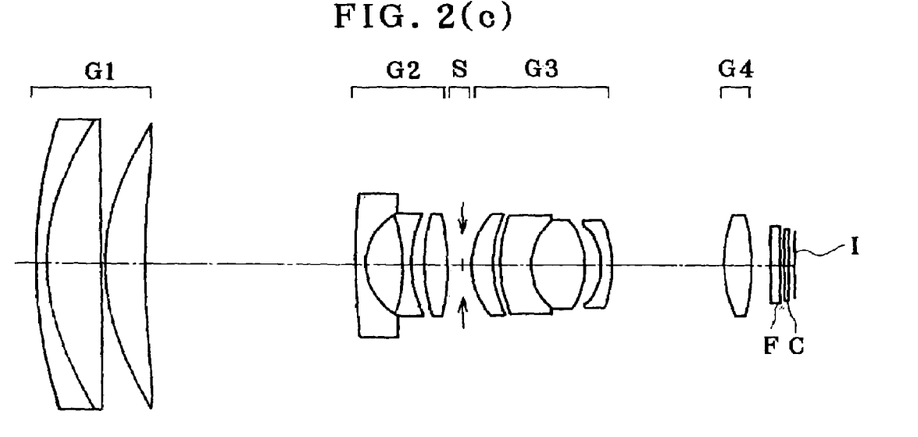

The zoom lens of the invention is now explained with reference to Examples 1 and 2. FIGS. 1 and 2 are illustrative in lens arrangement section of Examples 1 and 2, respectively, at the wide-angle ends (a), in intermediate settings (b) and at the telephoto ends (c) upon focusing on an infinite object point. Throughout the drawings, G1 stands for the first lens group, G2 the second lens group, S an aperture stop, G3 the third lens group, G4 the fourth lens group, F a plane-parallel plate that forms a low-pass filter with an IR cut coating applied on it, etc., C a plane-parallel form of cover glass for an electronic image pickup device, and I an image plane. The cover glass C could have a low-pass filter function.

EXAMPLE 1

As shown in FIG. 1, this example is directed to a zoom lens made up of, in order from its object side, a first lens group G1 of positive refracting power, a second lens group G2 of negative refracting power, an aperture stop S, a third lens group G3 of positive refracting power and a fourth lens group G4 of positive refracting power. Upon zooming from the wide-angle end to the telephoto end, the first lens group G1 stands substantially stationary from the wide-angle end up to the intermediate setting, and moves toward the object side from the intermediate setting to the telephoto end; the second lens group G2 moves toward the image side from the wide-angle end to the intermediate setting and stands stationary from the intermediate setting up to the telephoto end; the aperture stop S remains fixed; the third lens group G3 moves toward the object side; and the fourth lens group G4 moves in a convex locus toward the object side and is positioned nearer to the image side at the telephoto end than at the wide-angle end.

As viewed in order from the object side of the zoom lens, the first lens group G1 is composed of a cemented doublet consisting of a negative meniscus lens convex on its object side and a positive meniscus lens convex on its object side and a positive meniscus lens convex on its object side; the second lens group G2 is composed of a negative meniscus lens convex on its object side, a double-concave negative lens and a double-convex positive lens; the third lens group G3 is composed of a positive meniscus lens convex on its object side and a cemented doublet consisting of a negative meniscus lens convex on its object side and a double-convex positive lens and a negative meniscus lens convex on its image side; and the fourth lens group G4 is composed of one double-convex positive lens.

Five aspheric surfaces are used: one at the object-side surface of the double-convex positive lens in the second lens group G2, two at both surfaces of the positive meniscus lens in the third lens group G3, and two at both surfaces of the double-convex positive lens in the fourth lens group G4.

EXAMPLE 2

As shown in FIG. 2, this example is directed to a zoom lens made up of, in order from its object side, a first lens group G1 of positive refracting power, a second lens group G2 of negative refracting power, an aperture stop S, a third lens group G3 of positive refracting power and a fourth lens group G4 of positive refracting power. Upon zooming from the wide-angle end to the telephoto end, the first lens group G1 stands substantially stationary from the wide-angle end up to the intermediate setting and moves toward the object side from the intermediate setting to the telephoto end; the second lens group G2 moves toward the image side; the aperture stop S remains fixed; the third lens group G3 moves toward the object side; and the fourth lens group G4 moves in a convex locus toward the object side and is positioned nearer to the image side at the telephoto end than at the wide-angle end.

As viewed in order from the object side of the zoom lens, the first lens group G1 is composed of a cemented doublet consisting of a negative meniscus lens convex on its object side and a positive meniscus lens convex on its object side; and a positive meniscus lens convex on its object side; and the second lens group G2 is composed of a negative meniscus lens convex on its object side, a double-concave negative lens and a double-convex positive lens; the third lens group G3 is composed of a positive meniscus lens convex on its object side, a cemented doublet consisting of a negative meniscus lens convex on its object side and a double-convex positive lens and a negative meniscus lens convex on its image side; and the fourth lens group G4 is composed of one double-convex positive lens.

Three aspheric surfaces are used: one at the object-side surface of the double-convex positive lens in the second lens group G2 and two at both surfaces of the positive meniscus lens in the third lens group G3.

Set out just below are numerical data on each example, wherein symbols used hereinafter but not herein-before have the following meanings:

f: focal length of the zoom lens system,
ω: half angle of view,
$F_{NO}$: F-number,
WE: wide-angle end,
ST: intermediate setting,
TE: telephoto end,
$r_1, r_2, \ldots$ : radius of curvature of each lens surface,
$d_1, d_2, \ldots$ : space between adjacent lens surfaces,
$n_{d1}, n_{d2}, \ldots$ : d-line refractive index of each lens, and
$\nu_{d1}, \nu_{d2}, \ldots$ : Abbe constant of each lens.

Note here that aspheric shape is given by the following formula wherein x is an optical axis provided that the direction of travel of light is positive and y is a direction orthogonal to the optical axis.

$$x = (y^2/r)/\left[1 + \{1 - (K+1)(y/r)^2\}^{1/2}\right] + A_4 y^4 + A_6 y^6 + A_8 y^8 A_{10} y^{10}$$

where r is a paraxial radius of curvature, K is a conical coefficient, and $A_4$, $A_6$, $A_8$ and $A_{10}$ are the fourth-, sixth-, eighth- and tenth-order aspheric coefficients, respectively.

EXAMPLE 1

| | | | |
|---|---|---|---|
| $r_1 = 38.642$ | $d_1 = 1.20$ | $n_{d1} = 1.84666$ | $\nu_{d1} = 23.78$ |
| $r_2 = 22.802$ | $d_2 = 5.27$ | $n_{d2} = 1.48749$ | $\nu_{d2} = 70.23$ |
| $r_3 = 149.923$ | $d_3 = 0.50$ | | |
| $r_4 = 24.507$ | $d_4 = 3.75$ | $n_{d3} = 1.81600$ | $\nu_{d3} = 46.62$ |
| $r_5 = 77.798$ | $d_5 =$ (Variable) | | |
| $r_6 = 59.073$ | $d_6 = 1.00$ | $n_{d4} = 1.88300$ | $\nu_{d4} = 40.76$ |
| $r_7 = 6.314$ | $d_7 = 3.63$ | | |
| $r_8 = -22.442$ | $d_8 = 0.90$ | $n_{d5} = 1.58913$ | $\nu_{d5} = 61.14$ |
| $r_9 = 10.500$ | $d_9 = 1.35$ | | |
| $r_{10} = 24.010$ (Aspheric) | $d_{10} = 2.27$ | $n_{d6} = 1.84666$ | $\nu_{d6} = 23.78$ |
| $r_{11} = -34.261$ | $d_{11} =$ (Variable) | | |
| $r_{12} = \infty$ (Stop) | $d_{12} =$ (Variable) | | |
| $r_{13} = 7.040$ (Aspheric) | $d_{13} = 2.35$ | $n_{d7} = 1.58913$ | $\nu_{d7} = 61.14$ |
| $r_{14} = 16.335$ (Aspheric) | $d_{14} = 0.57$ | | |
| $r_{15} = 13.980$ | $d_{15} = 3.17$ | $n_{d8} = 1.84666$ | $\nu_{d8} = 23.78$ |
| $r_{16} = 6.427$ | $d_{16} = 5.30$ | $n_{d9} = 1.49700$ | $\nu_{d9} = 81.54$ |
| $r_{17} = -9.694$ | $d_{17} = 1.47$ | | |
| $r_{18} = -5.411$ | $d_{18} = 0.90$ | $n_{d10} = 1.80100$ | $\nu_{d10} = 34.97$ |
| $r_{19} = -8.902$ | $d_{19} =$ (Variable) | | |
| $r_{20} = 14.750$ (Aspheric) | $d_{20} = 2.51$ | $n_{d11} = 1.49700$ | $\nu_{d11} = 81.54$ |
| $r_{21} = -32.761$ (Aspheric) | $d_{21} =$ (Variable) | | |
| $r_{22} = \infty$ | $d_{22} = 0.85$ | $n_{d12} = 1.54771$ | $\nu_{d12} = 62.84$ |
| $r_{23} = \infty$ | $d_{23} = 0.50$ | | |
| $r_{24} = \infty$ | $d_{24} = 0.50$ | $n_{d13} = 1.51633$ | $\nu_{d13} = 64.14$ |
| $r_{25} = \infty$ | $d_{25} = 0.59$ | | |
| $r_{26} = \infty$ (Image plane) | | | |

Aspherical Coefficients

10th surface

K = 0
$A_4 = 2.37690 \times 10^{-4}$
$A_6 = -1.88394 \times 10^{-6}$
$A_8 = 6.44842 \times 10^{-8}$
$A_{10} = 3.84823 \times 10^{-11}$ 13th surface K = 0
$A_4 = -1.03572 \times 10^{-4}$
$A_6 = 4.50736 \times 10^{-6}$
$A_8 = -6.15535 \times 10^{-8}$ -continued $A_{10} = 1.98305 \times 10^{-9}$
14th surface $K = 0$
$A_4 = 2.12683 \times 10^{-4}$
$A_6 = 6.83635 \times 10^{-6}$
$A_8 = 9.92510 \times 10^{-8}$
$A_{10} = 9.64797 \times 10^{-10}$
20th surface $K = 0$
$A_4 = 2.94270 \times 10^{-4}$
$A_6 = -2.25339 \times 10^{-5}$
$A_8 = 2.47146 \times 10^{-6}$
$A_{10} = -6.19183 \times 10^{-8}$
21th surface $K = 0$
$A_4 = 3.78458 \times 10^{-4}$
$A_6 = -3.37157 \times 10^{-5}$
$A_8 = 3.42643 \times 10^{-6}$
$A_{10} = -8.55046 \times 10^{-8}$ Zooming Data (∞)

|  | WE | ST | TE |
|---|---|---|---|
| f (mm) | 4.3 | 14.1 | 46.1 |
| ω (°) | 38.746 | 13.309 | 4.137 |
| $F_{NO}$ | 2.80 | 3.22 | 3.70 |
| $d_5$ | 0.52 | 11.30 | 20.87 |
| $d_{11}$ | 12.68 | 1.50 | 1.50 |
| $d_{12}$ | 11.03 | 5.21 | 0.80 |
| $d_{19}$ | 1.28 | 3.77 | 13.25 |
| $d_{21}$ | 3.74 | 7.06 | 2.00 |

EXAMPLE 2

| $r_1 = 48.310$ | $d_1 = 1.20$ | $n_{d1} = 1.84666$ | $v_{d1} = 23.78$ |
| $r_2 = 25.445$ | $d_2 = 5.44$ | $n_{d2} = 1.48749$ | $v_{d2} = 70.23$ |
| $r_3 = 1354.174$ | $d_3 = 0.50$ | | |
| $r_4 = 25.997$ | $d_4 = 3.83$ | $n_{d3} = 1.81600$ | $v_{d3} = 46.62$ |
| $r_5 = 96.489$ | $d_5$ = (Variable) | | |
| $r_6 = 69.782$ | $d_6 = 1.00$ | $n_{d4} = 1.88300$ | $v_{d4} = 40.76$ |
| $r_7 = 6.250$ | $d_7 = 3.62$ | | |
| $r_8 = -18.401$ | $d_8 = 0.90$ | $n_{d5} = 1.58313$ | $v_{d5} = 59.46$ |
| $r_9 = 11.928$ | $d_9 = 1.26$ | | |
| $r_{10} = 26.362$ (Aspheric) | $d_{10} = 2.42$ | $n_{d6} = 1.84666$ | $v_{d6} = 23.78$ |
| $r_{11} = -29.463$ | $d_{11}$ = (Variable) | | |
| $r_{12} = \infty$ (Stop) | $d_{12}$ = (Variable) | | |
| $r_{13} = 7.321$ (Aspheric) | $d_{13} = 2.44$ | $n_{d7} = 1.58913$ | $v_{d7} = 61.14$ |
| $r_{14} = 17.328$ (Aspheric) | $d_{14} = 0.71$ | | |
| $r_{15} = 13.553$ | $d_{15} = 3.42$ | $n_{d8} = 1.84666$ | $v_{d8} = 23.78$ |
| $r_{16} = 6.447$ | $d_{16} = 5.48$ | $n_{d9} = 1.49700$ | $v_{d9} = 81.54$ |
| $r_{17} = -7.601$ | $d_{17} = 1.64$ | | |
| $r_{18} = -5.450$ | $d_{18} = 0.90$ | $n_{d10} = 1.80100$ | $v_{d10} = 34.97$ |
| $r_{19} = -12.512$ | $d_{19}$ = (Variable) | | |
| $r_{20} = 13.371$ | $d_{20} = 2.80$ | $n_{d11} = 1.48749$ | $v_{d11} = 70.23$ |
| $r_{21} = -27.604$ | $d_{21}$ = (Variable) | | |
| $r_{22} = \infty$ | $d_{22} = 0.85$ | $n_{d12} = 1.54771$ | $v_{d12} = 62.84$ |
| $r_{23} = \infty$ | $d_{23} = 0.50$ | | |
| $r_{24} = \infty$ | $d_{24} = 0.50$ | $n_{d13} = 1.51633$ | $v_{d13} = 64.14$ |
| $r_{25} = \infty$ | $d_{25} = 0.59$ | | |
| $r_{26} = \infty$ (Image plane) | | | |

Aspherical Coefficients

10th surface $K = 0$
$A_4 = 1.90530 \times 10^{-4}$

-continued $A_6 = 1.10300 \times 10^{-7}$
$A_8 = 3.29181 \times 10^{-8}$
$A_{10} = -5.20800 \times 10^{-10}$
13th surface $K = 0$
$A_4 = 8.63126 \times 10^{-6}$
$A_6 = -1.75048 \times 10^{-6}$
$A_8 = 2.90637 \times 10^{-7}$
$A_{10} = -4.89875 \times 10^{-9}$
14th surface $K = 0$
$A_4 = 3.71933 \times 10^{-4}$
$A_6 = 3.17630 \times 10^{-6}$
$A_8 = 4.16894 \times 10^{-7}$
$A_{10} = -4.32092 \times 10^{-9}$ Zooming Data (∞)

|  | WE | ST | TE |
|---|---|---|---|
| f (mm) | 4.3 | 14.1 | 46.1 |
| ω (°) | 38.384 | 13.235 | 4.087 |
| $F_{NO}$ | 2.80 | 3.22 | 3.70 |
| $d_5$ | 0.50 | 10.72 | 21.38 |
| $d_{11}$ | 13.86 | 3.72 | 1.50 |
| $d_{12}$ | 10.06 | 3.17 | 0.80 |
| $d_{19}$ | 1.24 | 4.81 | 11.33 |
| $d_{21}$ | 2.83 | 6.15 | 2.00 |

Figure 3A:
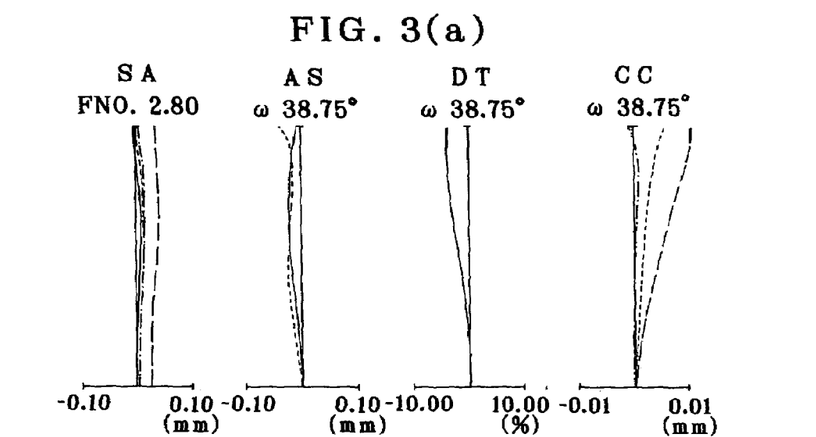
FIG. 3 is an aberration diagram for Example 1 upon focusing on an infinite object point.
Figure 3B:
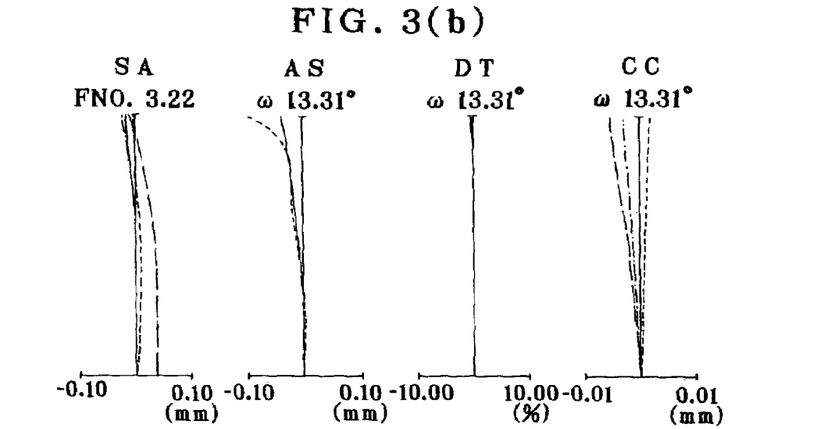
Figure 3C:
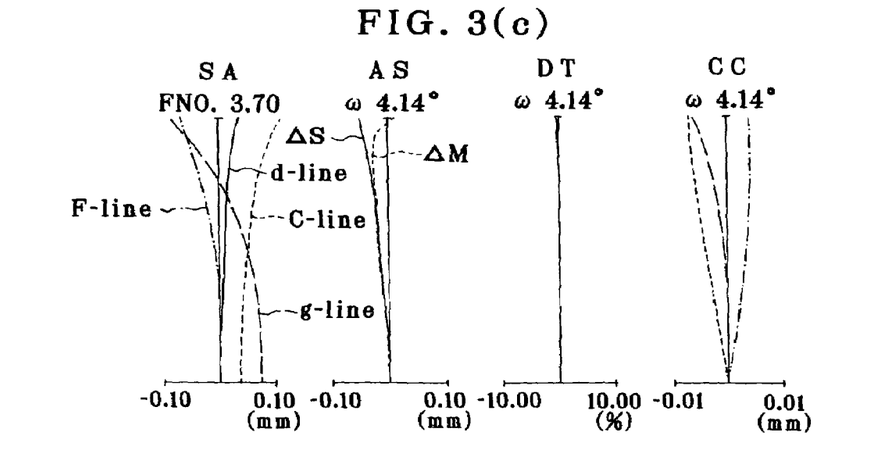
Figure 4A:
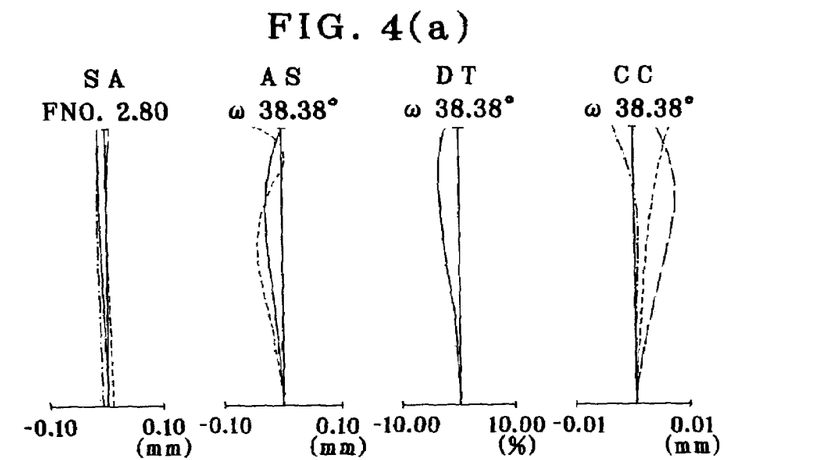
FIG. 4 is an aberration diagram for Example 2 upon focusing on an infinite object point.
Figure 4B:
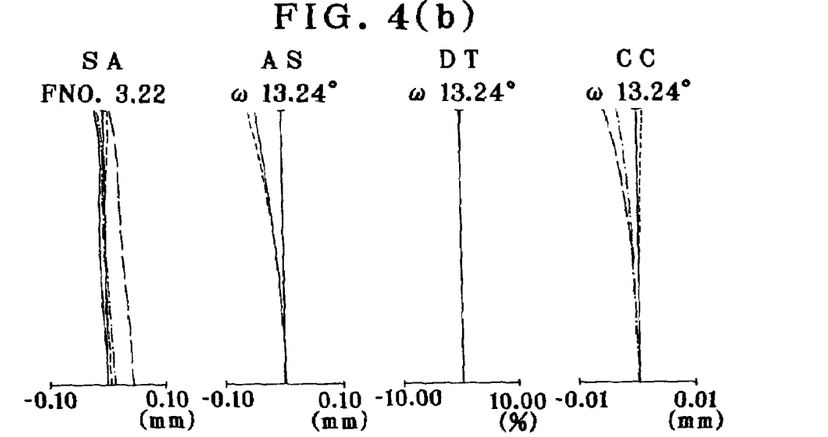
Figure 4C:
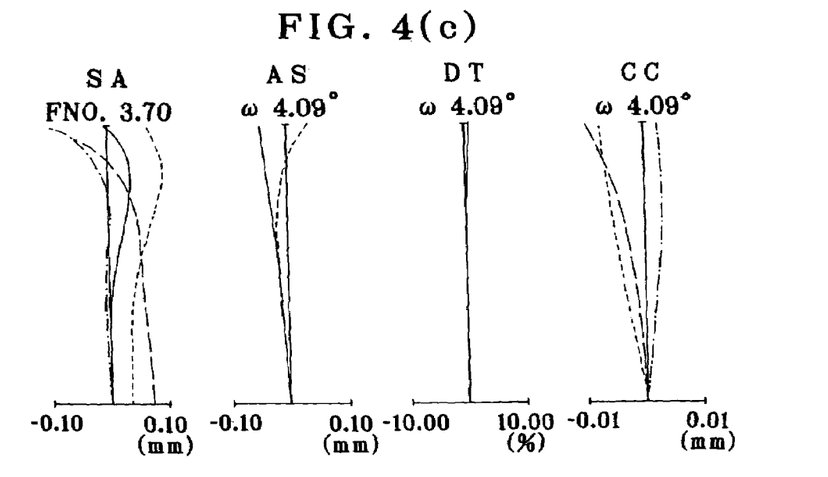

FIGS. 3 and 4 are aberration diagrams for Examples 1 and 2, respectively, upon focusing on an infinite object point. In these aberration diagrams, (a), (b) and (c) are indicative of spherical aberration (SA), astigmatism (AS), distortion (DT) and chromatic aberration of magnification (CC) at the wide-angle end, in the intermediate setting and at the telephoto end, respectively.

Enumerated just below are the parameter values regarding conditions (1), (2) and (3) in each example.

| Parameter | Example 1 | Example 2 |
|---|---|---|
| $f_w$ | 4.3 | 4.3 |
| $f_t$ | 46.10001 | 46.10001 |
| $f_1$ | 38.54366 | 38.23155 |
| $f_2$ | −7.68901 | −7.75488 |
| $f_3$ | 14.36534 | 13.91904 |
| $f_4$ | 20.82884 | 18.90071 |
| $M_{2w}$ | −0.29641 | −0.29497 |
| $M_{2t}$ | −1.37472 | −1.43389 |
| $M_{3w}$ | −0.56207 | −0.56284 |
| $M_{3t}$ | −1.15534 | −1.16562 |
| $M_{4w}$ | 0.66963 | 0.67746 |
| $f_t/f_w$ | 10.72 | 10.72 |
| $f_1/f_w$ | 8.96 | 8.89 |
| $f_2/f_w$ | −1.79 | −1.80 |
| $f_3/f_w$ | 3.34 | 3.24 |
| $f_4/f_w$ | 4.84 | 4.40 |
| $M_{2t}/M_{2w}$ | 4.64 | 4.86 |
| $M_{3t}/M_{3w}$ | 2.06 | 2.07 |
| $M_{4t}/M_{4w}$ | 1.12 | 1.06 | where $f_n$: the focal length of the n-th lens group,
$f_w$: the focal length of the zoom lens system at the wide-angle end,
$f_t$: the focal length of the zoom lens system at the telephoto end,
$M_{nt}$: the transverse magnification of the n-th lens group at the telephoto end, and $M_{nw}$: the transverse magnification of the second lens group at the wide angle end.

Figure 5:
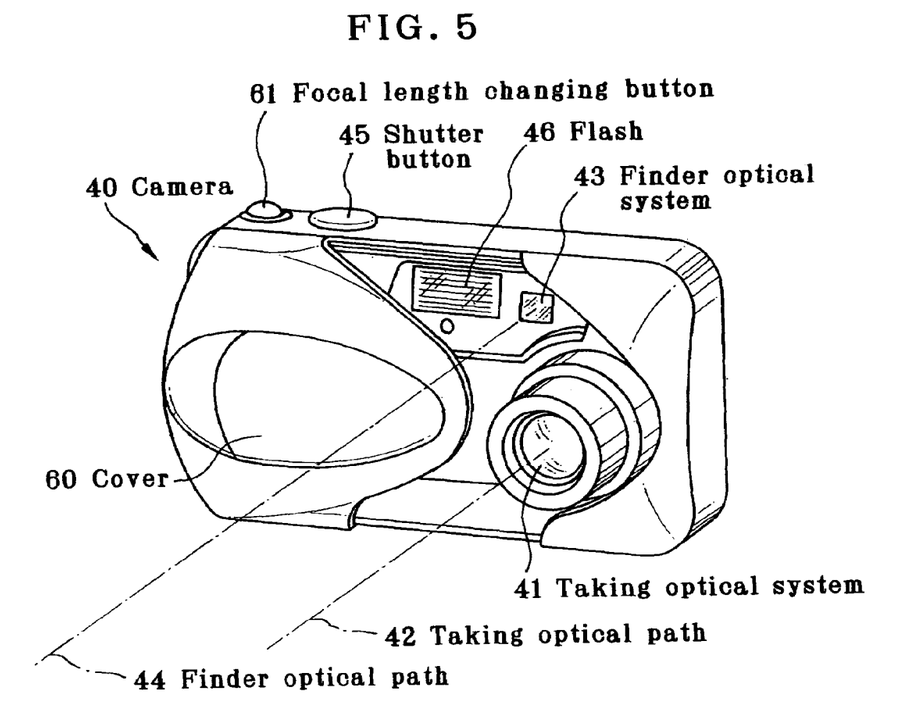
FIG. 5 is a front perspective illustration showing the appearance of one exemplary digital camera according to the invention.
Figure 6:
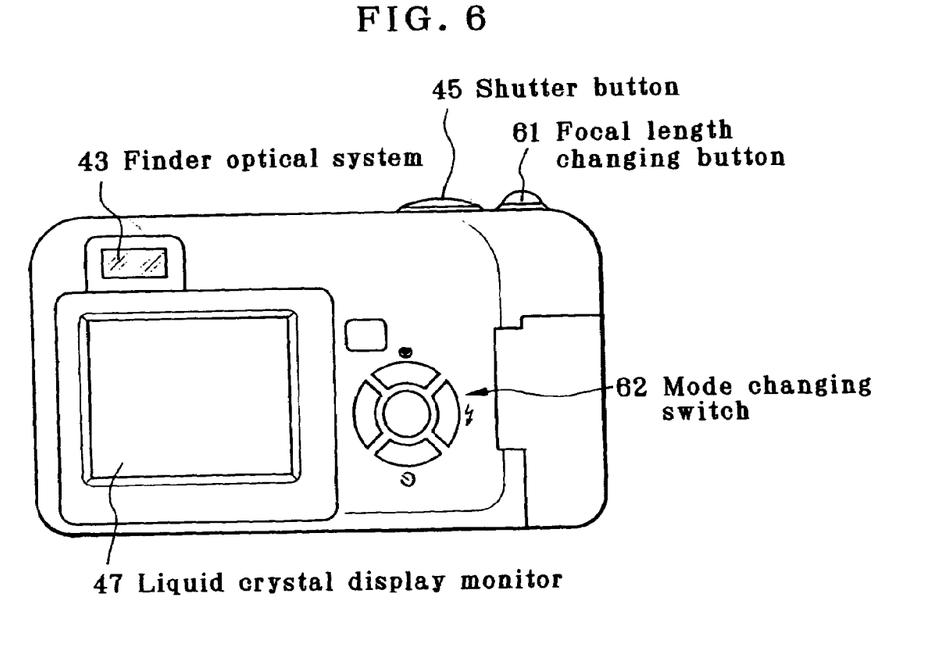
FIG. 6 is a rear perspective illustration of the digital camera of FIG. 5.
Figure 7:
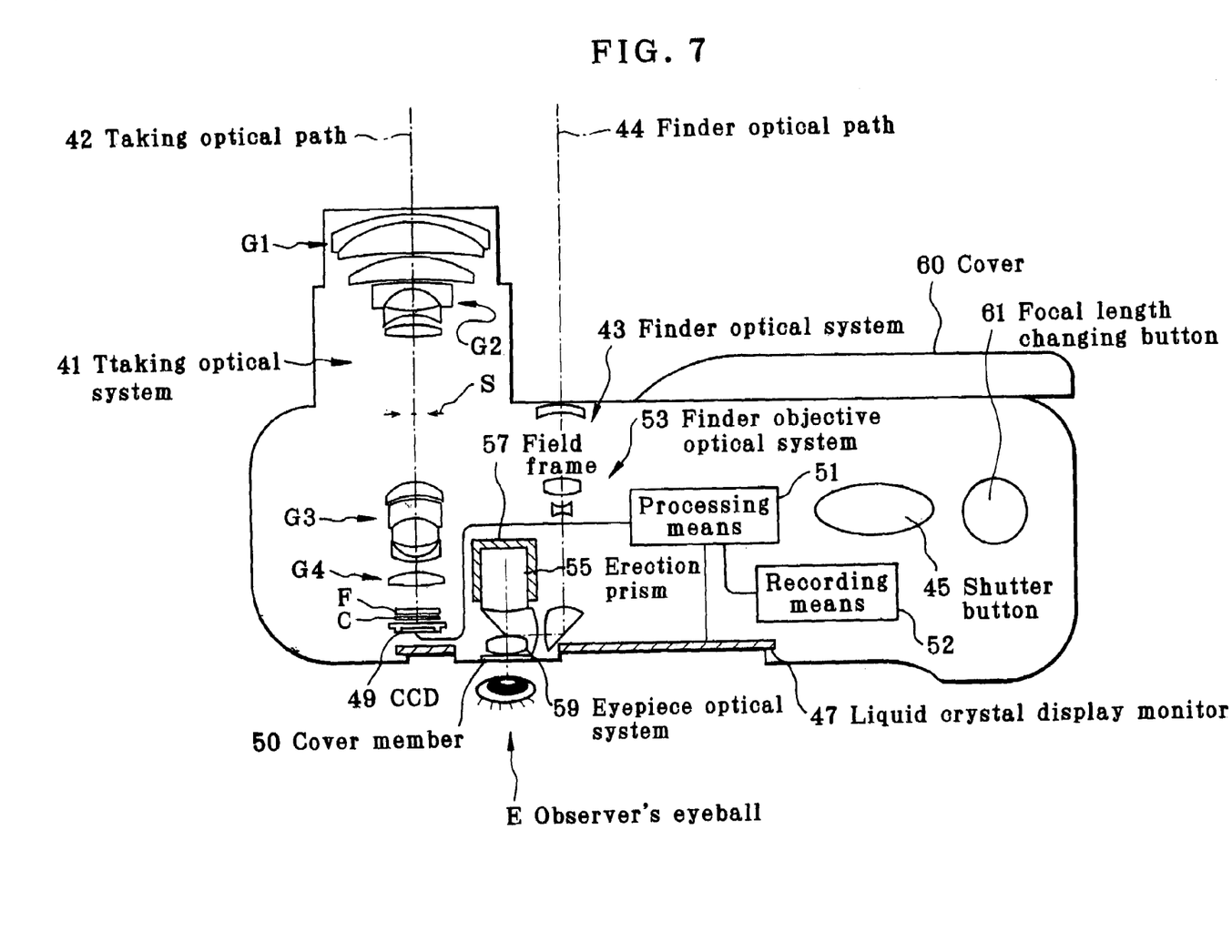
FIG. 7 is a sectional view of the digital camera of FIG. 5.

FIGS. 5, 6 and 7 are illustrative in conception of a digital camera according to the invention, wherein any one of the above zoom lenses is built in a taking optical system 41. Specifically, FIGS. 5 and 6 are a front and a rear perspective view showing the appearance of a digital camera 40, and FIG. 7 is illustrative in schematic perspective of the construction of the digital camera 40. FIGS. 5 and 7 illustrate that the taking optical system is not received in a collapsible lens mount. In this embodiment, the digital camera 40 comprises a taking optical system 41 including a taking optical path 42, a finder optical system 43 including a finder optical path 44, a shutter button 45, a flash 46, a liquid crystal display monitor 47, a focal length changing button 61, a mode changing switch 62, etc. When the taking optical system 41 is received in a collapsible lens mount, a cover 60 is slid over to cover up the taking optical system 41, finder optical system 43 and flash 46. As the cover 60 is held open to put the camera 40 in a taking mode, the taking optical system 41 is moved out of the collapsible lens mount as shown in FIG. 7. Then, as the shutter button 45 mounted on the upper portion of the camera 40 is pressed down, images are taken through the taking optical system 41, for instance, the zoom lens of Example 1. An object image formed through the taking optical system 41 is formed on the image pickup plane of CCD 49 via a low-pass filter F with an IR cut coating applied on it and a cover glass C. The object image received at CCD 49 is displayed as an electronic image on the liquid crystal display monitor 47 via processing means 51, which could be connected with recording means 52 to record therein a taken electronic image. Note here that the recording means 52 could be provided separately from the processing means 51 or could be designed such that images are electronically recorded or written on a floppy disc, a memory card, an MO or the like. The camera could be set up as a silver-halide camera with a silver-halide film used in plane of CCD 49.

Further, on the finder optical path 44 there is located a finder objective optical system 53. The finder optical objective system 53 is made up of a zoom optical system comprising a plurality of lens groups (three groups in the illustrated embodiment) and two prisms, and variable in focal length in association with the zoom lens of the taking optical system 41. An object image formed through the finder objective optical system 53 is formed on the field frame 54 of an erection prism 55 that is an image erection member. In the rear of the erection prism 55, there is located an eyepiece optical system 59 for guiding the erected image into a viewer's eyeball E. Note here that a cover member 50 is located on the exit side of the eyepiece optical system 59.

The thus constructed digital camera 40 is much more improved in terms of performance and compactness. This is because the taking optical system 41 according to the invention can be received in the collapsible lens mount with a very small thickness, and can have high zoom ratios all over the zooming range and very stable image-formation capability as well.

What we claim is:

1. A zoom lens, comprising, in order from an object side thereof,
    a first lens group of positive refracting power,
    a second lens group of negative refracting power,
    a third lens group of positive refracting power, and
    a fourth lens group of positive refracting power,
wherein:
    when a zoom lens system moves from a wide-angle end to a telephoto end thereof for zooming, a space between adjacent lens groups varies and the first lens group moves nearer to the object side at the telephoto end than at the wide-angle end, and
    the zoom lens system satisfies the following conditions:

$$5.7 < f_1/f_w < 20 \quad (1)$$

$$4.1 < M_{2t}/M_{2w} < 15 \quad (2)$$

where $f_1$ is a focal length of the first lens group,
    $f_w$ is a focal length of the zoom lens system at the wide-angle end,
    $M_{2t}$ is a transverse magnification of the second lens group at the telephoto end, and
    $M_{2w}$ is a transverse magnification of the second lens group at the wide-angle end.

2. The zoom lens according to claim 1, which satisfies the following condition:

$$2.7 < f_3/f_w < 15 \quad (3)$$

where $f_3$ is a focal length of the third lens group.

3. A zoom lens, comprising, in order from an object side thereof,
    a first lens group of positive refracting power,
    a second lens group of negative refracting power,
    a third lens group of positive refracting power, and
    a fourth lens group of positive refracting power,
wherein:
    when a zoom lens system moves from a wide-angle end to a telephoto end thereof for zooming, a space between adjacent lens groups varies and the first lens group moves nearer to the object side at the telephoto end than at the wide-angle end, and
    the zoom lens system satisfies the following conditions:

$$5.7 < f_1/f_w < 20 \quad (1)$$

$$3.2 < M_{2t}/M_{2w} < 15 \quad (2)'$$

$$2.7 < f_3/f_w < 15 \quad (3)$$

where $f_1$ is a focal length of the first lens group,
    $f_w$ is a focal length of the zoom lens system at the wide-angle end,
    $M_{2t}$ is a transverse magnification of the second lens group at the telephoto end,
    $M_{2w}$ is a transverse magnification of the second lens group at the wide-angle end, and
    $f_3$ is a focal length of the third lens group.

4. The zoom lens according to claim 1, wherein:
an aperture stop is interposed between the second lens group and the third lens group, wherein said aperture stop remains fixed during zooming from the wide-angle end to the telephoto end.

5. The zoom lens according to claim 1, wherein:
the third lens group comprises at least one aspheric lens.

6. The zoom lens according to claim 1, wherein:
a number of the lens groups contained in the zoom lens is only four.

7. The zoom lens according to claim 1, wherein:
when the zoom lens system moves from the wide-angle end to the telephoto end for zooming,
the first lens group is positioned nearer to the object side at the telephoto end than at the wide-angle end, and the first lens group is larger in an amount of movement from an intermediate setting to the telephoto end rather than from the wide-angle end to the intermediate setting, the second lens group is positioned nearer to an image side at the telephoto end than at the wide-angle end, and the second lens group is larger in an amount of movement from the wide-angle end to the intermediate setting rather than from the intermediate setting to the telephoto end, the third lens group is positioned nearer to the object side at the telephoto end than at the wide-angle end, and the fourth lens group G4 moves toward the object side and thereafter toward the image side.

8. The zoom lens according to claim 1, wherein:
the first lens group comprises, in order from an object side thereof, a cemented doublet consisting of a negative meniscus lens convex on an object side thereof and
a positive meniscus lens convex on an object side thereof, and
a positive meniscus lens convex on an object side thereof.

9. The zoom lens according to claim 1, wherein:
the second lens group comprises, in order from an object side thereof,
a negative meniscus lens convex on an object side thereof,
a double-concave negative lens, and
a double-convex positive lens.

10. The zoom lens according to claim 1, wherein:
the third lens group comprises, in order from an object side thereof,
a positive meniscus lens convex on an object side thereof,
a cemented doublet consisting of a negative meniscus lens convex on an object side thereof and a double-convex positive lens, and
a negative meniscus lens convex on an image side thereof.

11. The zoom lens according to claim 1, wherein:
the fourth lens group consists of one double-convex positive lens.

12. The zoom lens according to claim 9, wherein:
said double-convex positive lens in said second lens group has an aspheric surface.

13. The zoom lens according to claim 10, wherein: said positive meniscus lens in said third lens group has an aspheric surface.

14. The zoom lens according to claim 11, wherein: said double-convex positive lens in said fourth lens group has an aspheric surface.

15. The zoom lens according to claim 3, wherein:
an aperture stop is interposed between the second lens group and the third lens group, wherein said aperture stop remains fixed during zooming from the wide-angle end to the telephoto end.

16. The zoom lens according to claim 3, wherein:
the third lens group comprises at least one aspheric lens.

17. The zoom lens according to claim 3, wherein:
a number of the lens groups contained in the zoom lens is only four.

18. The zoom lens according to claim 3,
wherein:
when the zoom lens system moves from the wide-angle end to the telephoto end for zooming,
the first lens group is positioned nearer to the object side at the telephoto end than at the wide-angle end, and the first lens group is larger in an amount of movement from an intermediate setting to the telephoto end rather than from the wide-angle end to the intermediate setting, the second lens group is positioned nearer to an image side at the telephoto end than at the wide-angle end, and the second lens group is larger in an amount of movement from the wide-angle end to the intermediate setting rather than from the intermediate setting to the telephoto end, the third lens group is positioned nearer to the object side at the telephoto end than at the wide-angle end, and the fourth lens group G4 moves toward the object side and thereafter toward the image side.

19. The zoom lens according to claim 3, wherein:
the first lens group comprises, in order from an object side thereof, a cemented doublet consisting of a negative meniscus lens convex on an object side thereof and
a positive meniscus lens convex on an object side thereof, and
a positive meniscus lens convex on an object side thereof.

20. The zoom lens according to claim 3, wherein:
the second lens group comprises, in order from an object side thereof,
a negative meniscus lens convex on an object side thereof,
a double-concave negative lens, and
a double-convex positive lens.

21. The zoom lens according to claim 3, wherein:
the third lens group comprises, in order from an object side thereof,
a positive meniscus lens convex on an object side thereof,
a cemented doublet consisting of a negative meniscus lens convex on an object side thereof and a double-convex positive lens, and
a negative meniscus lens convex on an image side thereof.

22. The zoom lens according to claim 3, wherein:
the fourth lens group consists of one double-convex positive lens.

23. The zoom lens according to claim 20, wherein:
said double-convex positive lens in said second lens group has an aspheric surface.

24. The zoom lens according to claim 21, wherein: said positive meniscus lens in said third lens group has an aspheric surface.

25. The zoom lens according to claim 22, wherein: said double-convex positive lens in said fourth lens group has an aspheric surface.

* * * * *